(12) United States Patent
Shubs, Jr. et al.

(10) Patent No.: US 9,718,486 B1
(45) Date of Patent: Aug. 1, 2017

(54) SYSTEM FOR ANALYZING HEALTH OF TRAIN

(71) Applicant: Electro-Motive Diesel, Inc., LaGrange, IL (US)

(72) Inventors: Alexander Shubs, Jr., Chicago, IL (US); David M. Roenspies, Elburn, IL (US)

(73) Assignee: Electro-Motive Diesel, Inc., LaGrange, IL (US)

(*) Notice: Subject to any disclaimer, the term of this patent is extended or adjusted under 35 U.S.C. 154(b) by 0 days.

(21) Appl. No.: 15/012,149

(22) Filed: Feb. 1, 2016

(51) Int. Cl.
*B61L 15/00* (2006.01)
*G01M 17/08* (2006.01)
*B61L 27/00* (2006.01)

(52) U.S. Cl.
CPC ....... *B61L 15/0081* (2013.01); *B61L 27/0077* (2013.01); *G01M 17/08* (2013.01)

(58) Field of Classification Search
CPC .. B61L 15/0081; B61L 27/0077; G01M 17/08
See application file for complete search history.

(56) References Cited

U.S. PATENT DOCUMENTS

| | | |
|---|---|---|
| 4,041,470 A | 8/1977 | Slane et al. |
| 5,445,347 A | 8/1995 | Ng |
| 6,243,628 B1 | 6/2001 | Bliley et al. |
| 7,499,777 B2 | 3/2009 | Grichnik et al. |
| 7,783,507 B2 | 8/2010 | Schick et al. |
| 8,649,921 B2 | 2/2014 | Herden et al. |
| 2005/0120904 A1* | 6/2005 | Kumar ............... B60L 15/32 105/35 |
| 2006/0025903 A1* | 2/2006 | Kumar ............... B61L 15/0081 701/19 |
| 2006/0085103 A1* | 4/2006 | Smith, Jr. ........... B61L 15/0027 701/19 |

(Continued)

FOREIGN PATENT DOCUMENTS

| | | | |
|---|---|---|---|
| EP | 1884436 | 1/2010 | |
| IE | EP 2765053 A2 * | 8/2014 | ......... B61L 27/0077 |

(Continued)

OTHER PUBLICATIONS

Guo et al., "Data-Based Health State Analysis for the Axle of High Speed Train," year: 2015, pp. 454-457.*

(Continued)

*Primary Examiner* — Tuan C. To

(57) ABSTRACT

A system for analyzing health of assets in train is provided. The system includes a sensing unit configured to generate health data of sub-assets. The system also includes a controller in communication with the sensing unit to receive the health data. The controller is configured to display, in a graphical user interface (GUI), a list of assets configurable to allow selection of one asset therefrom. The controller is configured to receive an input command, in the GUI, to select a desired asset from the list of assets for requesting information about health of the desired asset. The controller is configured to display, in the GUI, a visual representation of the desired asset, along with the sub-assets, in response to the input command. The controller is configured to flag, in the GUI, the sub-assets in the visual representation of the desired asset based on the health data of the sub-assets.

20 Claims, 7 Drawing Sheets

(56) References Cited

U.S. PATENT DOCUMENTS

| | | |
|---|---|---|
| 2006/0235707 A1 | 10/2006 | Goldstein et al. |
| 2012/0277938 A1* | 11/2012 | DeSanzo ................ G07C 5/006 |
| | | 701/19 |
| 2013/0342362 A1 | 12/2013 | Martin |
| 2014/0039953 A1* | 2/2014 | McQuillan ....... G06Q 10/06312 |
| | | 705/7.13 |
| 2014/0196462 A1 | 7/2014 | Nguyen et al. |
| 2014/0200952 A1 | 7/2014 | Hampapur et al. |
| 2015/0125832 A1* | 5/2015 | Tran ......................... G09B 5/00 |
| | | 434/127 |
| 2016/0009304 A1* | 1/2016 | Kumar ................ B61L 27/0027 |
| | | 701/19 |
| 2016/0080223 A1* | 3/2016 | Shubs, Jr. ........... H04L 41/0609 |
| | | 709/224 |
| 2016/0153806 A1* | 6/2016 | Ciasulli ............... G06F 11/0751 |
| | | 702/184 |
| 2016/0159379 A1* | 6/2016 | Raeder .................. B60K 35/00 |
| | | 701/19 |

FOREIGN PATENT DOCUMENTS

| | | | |
|---|---|---|---|
| JP | EP 2899056 A1 * | 7/2015 | .......... B61L 27/0077 |
| WO | 2015025188 | 2/2015 | |

OTHER PUBLICATIONS

Alessandro et al., "Energy-harvesting WSNs for structural health monitoring of underground train tunnels," year: 2013, pp. 75-76.*

* cited by examiner

SYSTEM FOR ANALYZING HEALTH OF TRAIN

TECHNICAL FIELD

The present disclosure generally relates to a system for analyzing health of a train, and more particularly relates to system for analyzing health data of assets of the train.

BACKGROUND

A train or locomotive typically includes various types of assets such as, but not limited to, locomotives, wagons, and waysides. The assets may include various types of sub-assets such as, brakes, engine, fuel system, etc. Health of these assets needs to be timely monitored for proper operation of the train without any breakdown or downtime for maintenance. Unscheduled servicing of the train may incur an extra cost and thus may not be economically feasible. Although there are methods and systems available for regular and timely maintenance of the health of the assets of the train, operator(s) may still find it difficult to identify the current health of the train at any given point of time. In addition, current systems for receiving and interpreting status alerts for train assets are cumbersome and difficult to interpret. The current system does not allow the train operator to efficiently and accurately evaluate health of asset of the train and does not provide health data of any specific asset of the train to convey to the operator whether potential issues exist with any of the assets within the train.

For reference, U.S. Pat. No. 5,445,347 relates to a status monitor and diagnostic unit (SMDU) in every car of a magnetic levitation (MAGLEV) train or other vehicle. The SMDU includes sensors for monitoring the operational status or condition of the car. Network status interface units (NSIU) are provided at stations and at other fixed locations through which the train passes. The NSIUs transmit polling signals which cause the SMDUs to transmit data signals representing the operational status of the cars to the NSIUs via a spread-spectrum time-division-multiple-access (TDMA) network when the train passes proximate thereto. The NSIUs relay the data signals to a maintenance control center (MCC) via a wide-area-network (WAN). The MCC generates a prognosis of the operating conditions of the cars in accordance with the data signals, and schedules maintenance actions based on the prognosis. The MCC also includes a computerized maintenance data base which can be accessed by technicians at remote repair facilities.

SUMMARY OF THE DISCLOSURE

In one aspect of the present disclosure, a system for analyzing health of assets in a train is provided. Each of the assets includes one or more sub-assets. The system includes a sensing unit having a plurality of sensors associated with the one or more sub-assets. The sensing unit is configured to generate health data of the one or more sub-assets. The system also includes a controller in communication with the sensing unit to receive the health data. The controller is configured to display, in a graphical user interface (GUI), a list of assets. The list of assets is configurable to allow selection of one asset therefrom. The controller is further configured to receive an input command, in the GUI, to select a desired asset from the list of assets. The input command is configurable to request information about the health of the desired asset. The controller is further configured to display, in the GUI, a visual representation of the desired asset, along with the one or more sub-assets, in response to receipt of the input command. The controller is further configured to flag, in the GUI, the one or more sub-assets in the visual representation of the desired asset based on the health data of the one or more sub-assets.

In another aspect of the present disclosure a computer-implemented method for analyzing health of assets in a train is provided. Each of the assets includes one or more sub-assets. The method includes generating health data of the one or more sub-assets. The method further includes displaying a list of assets. The list of assets is configurable to allow selection of one asset therefrom. The method further includes receiving an input command to select a desired asset from the list of assets. The method further includes displaying a visual representation of the desired asset, along with the one or more sub-assets, in response to receipt of the input command. The method further includes flagging the one or more sub-assets in the visual representation of the desired asset based on the health data of the one or more sub-assets.

In another aspect of the present disclosure a computing device including a medium to store sequences of instructions which when executed analyze health of assets in a train is provided. Each of the assets includes one or more sub-assets. The computing device includes a display unit configured to provide a graphical user interface (GUI) and a controller. The controller is configured to display, in the GUI, a list of assets. The list of assets is configurable to allow selection of one asset therefrom. The controller is further configured to receive an input command, in the GUI, to select a desired asset from the list of assets. The input command is configurable to request information about health of the desired asset. The controller is further configured to display, in the GUI, a visual representation of the desired asset, along with the one or more sub-assets, in response to receipt of the input command. The controller is further configured to flag, in the GUI, the one or more sub-assets in the visual representation of the desired asset based on health data of the one or more sub-assets.

Other features and aspects of this disclosure will be apparent from the following description and the accompanying drawings.

DETAILED DESCRIPTION

Figure 1:
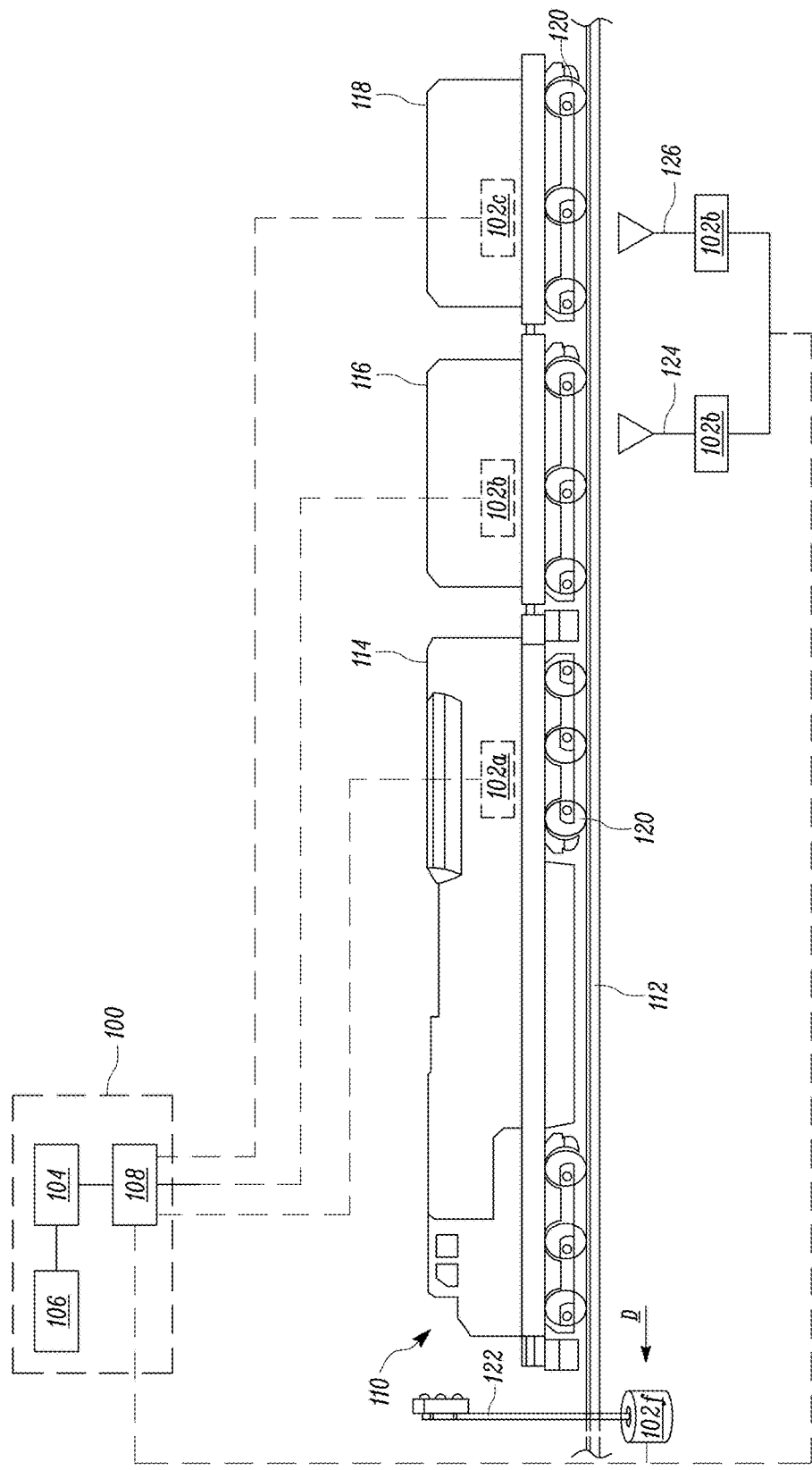
FIG. 1 is a schematic of a train including a plurality of assets, according to an embodiment of the present disclosure.

The detailed description of exemplary embodiments of the disclosure herein makes reference to the accompanying drawings and figures, which show the exemplary embodiments by way of illustration only. While these exemplary embodiments are described in sufficient detail to enable those skilled in the art to practice the disclosure, it should be understood that other embodiments may be realized and that logical and mechanical changes may be made without departing from the scope of the disclosure. It will be apparent to a person skilled in the pertinent art that this disclosure can also be employed in a variety of other applications. Thus, the detailed description herein is presented for purposes of illustration only and not of limitation. For example, the steps recited in any of the method or process descriptions may be executed in any order and are not limited to the order presented. As such, other alternatives can also be provided to the method or process descriptions where one or more steps are added, one or more steps are removed, or one or more steps are provided in a different sequence without departing from the scope of the claims herein.

For the sake of brevity, conventional data networking, application development and other functional aspects of the systems (and components of the operating systems) may not be described in detail herein. Furthermore, the connecting lines shown in the various figures contained herein are intended to represent exemplary functional relationships and/or physical/communicative couplings between the various elements. It should be noted that many alternative or additional functional relationships or physical/communicative connections may be present in a practical system.

The present disclosure is described herein with reference to system architecture, block diagrams and flowchart illustrations of methods, and computer program products according to various aspects of the disclosure. It will be understood that each functional block of the block diagrams, the flowchart illustrations, and combinations of functional blocks in the block diagrams, the flowchart illustrations, and combinations of functional blocks in the block diagrams, respectively, can be implemented by computer program instructions.

These computer program instructions may be loaded onto a general-purpose computer, special purpose computer, or other programmable data processing apparatus to produce a machine, such that the instructions that execute on the computer or other programmable data processing apparatus create methods for implementing the functions specified in the flowchart block or blocks. These computer program instructions may also be stored in a computer-readable memory that can direct a computer or other programmable data processing apparatus to function in a particular manner, such that the instructions stored in the computer-readable memory produce output/s that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of steps for performing the specified functions, and program instruction methods for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. It should be further appreciated that the multiple steps as illustrated and described as being combined into a single step for the sake of simplicity may be expanded into multiple steps. In other cases, steps illustrated and described as single process steps may be separated into multiple steps but have been combined for simplicity.

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular is also to be construed to relate to the plural and vice-versa without limiting the scope of the disclosure to the exact number or type of such elements unless set forth explicitly in the appended claims.

FIG. 1 illustrates a schematic representation of a train 110, in which embodiments of the present disclosure are implemented. The train 110 includes a plurality of assets configured to run on rails 112. The train 110 may be of any type. In one embodiment, the train 110 may be a steam locomotive. In another embodiment, the train 110 may be a diesel locomotive having a gas engine. In another embodiment, the train 110 may be an electric locomotive employing one or more pantographs to draw power from an overhead catenary (not shown). In an embodiment, the train 110 may be a manned or unmanned train 110.

The plurality of assets 114, 116, and 118 of the train 110 (hereinafter sometimes referred to as 'train assets') are coupled one behind the other in the train 110. The train 110 may be powered by an engine such that wheels 120 of the assets 114, 116, and 118 roll on the rails 112. Although three train assets 114, 116, 118 are shown herein, it is to be understood that the number of assets shown is merely exemplary in nature, and hence, non-limiting of this disclosure. Thus, the train 110 may include any number of assets therein without deviating from the scope of the present disclosure. In an embodiment, the train 110 may travel along various other kinds of assets like, wayside assets 122, 124, 126 as shown in FIG. 1. In an example, the wayside asset 122 is an automatic block system, hereinafter referred as automatic block system 122. Similarly, the wayside asset 124 and 126 are radios. It is to be understood that the number of wayside assets shown is merely exemplary in nature, and hence, non-limiting of this disclosure. The automatic block system 122 may provide a multi-aspect signaling to passing-by the train 110. The multi-aspect signaling may be used either to 'STOP' or 'HOLD' or 'GO' the train 110 depending on real-time conditions and scheduling of the train 110.

In an embodiment as shown in FIG. 1, the train 110 is a puller locomotive, i.e., engine asset 114 is disposed before the asset 116 and configured to pull the train 110 in a direction of travel 'D'. However, in another embodiment, the train 110 may additionally include a pusher locomotive disposed after the asset 118. The pusher locomotive may also be configured to push the train 110 in the direction of travel 'D'. Therefore, in the preceding embodiment, the puller locomotive and the pusher locomotive may co-operatively drive the train 110 in the direction of travel 'D'.

In an embodiment as shown in FIG. 1, the train 110 is associated with a system 100 for analyzing health of the assets such as, the train assets 114, 116 and 118, and the wayside assets 122, 124 and 126 at any given point of time. Each of the train assets 114 includes one or more sub-assets. The sub-assets may include, but not limited to, a brake system, an engine system, a fuel system, air conditioning system, ECP brake system, air brake system, parking brake system, traction system, electrical system, ATP/ATO system, etc. The system 100 includes a sensing unit 108 for receiving health data from a plurality of sensors 102a, 102b, 102c, 102d, 102e and 102f disposed in the assets 114, 116, 118, 122, 124 and 126. The system 100 further includes a Graphical User Interface (GUI) 106, and a controller 104 in communication with the GUI 106 and the sensing unit 108. The plurality of sensors 102a, 102b, 102c, 102d, 102e, and 102f are associated with the assets 114, 116, 118, 122, 124 and 126 respectively.

Figure 2:
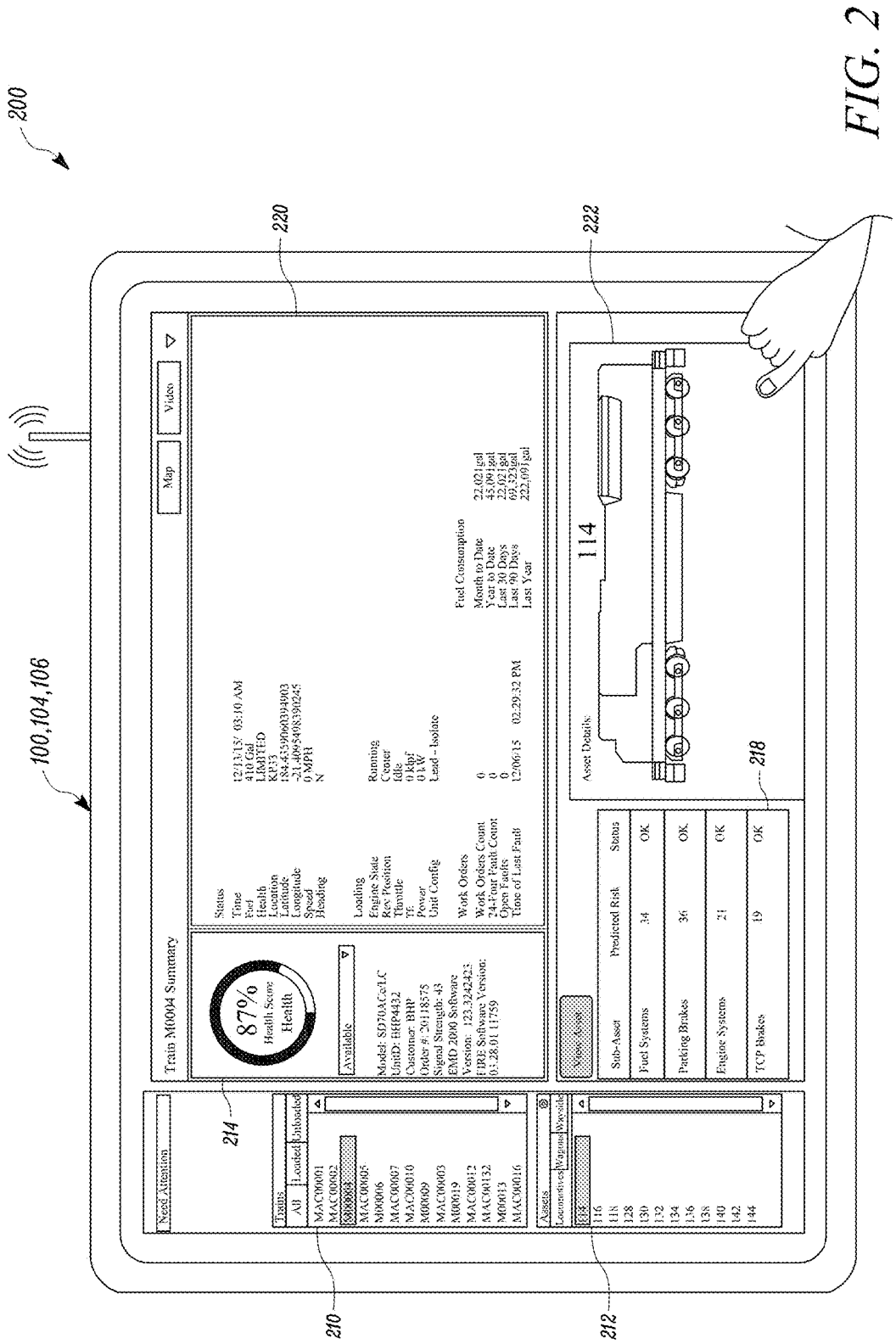
FIG. 2 is a diagrammatic representation of an exemplary customizable computing device for providing user/operator selectable options pertaining to health data of trains, in accordance with various embodiments of the disclosure.

FIG. 2 illustrates a diagrammatic representation of an exemplary customizable computing device 200 for providing user/operator selectable options pertaining to health data of the trains. The computing device 200 includes the system 100 including a display as the GUI 106, and the controller 104 in communication with the GUI 106 and the sensing unit 108. In an embodiment, the controller 104 and the GUI 106 are configured to integrally form a part of the computing device 200. In an embodiment, the computing device 200 may include a laptop or a personal computer or a personal digital assistant (PDA) or a tablet device or a smartphone. The computing device 200 is configured to be in continuous communication via the controller 104, with the train plying in a specific region in a place. In addition, the computing device 200 may also be configured to communicate with a central server located remotely to upload data received from the train 110 in communication with the computing device 200 through the controller 104 via a network.

The operator operates the computing device 200 to obtain details of the train 110 plying in the region and the controller 104 which is in communication with the train 110 in the specific region obtains the details, so as to list the train 110 plying in the specific region. An engine control module (not shown) of the train 110 communicates the details, for list of trains, to the system 100. The GUI 106 which is in communication with the controller 104 receives the data from the controller 104 and displays details such as, but not limited to, a list of trains in block 210. It is contemplated that the display in the GUI 106 at the block 210 lists various number of trains plying in the specific region and the list of trains may be viewed by scrolling down the list in the block 210. The operator may select any train from the list of trains at the block 210 to determine health of the selected train. Once the operator selects the train, a list of assets, such as, but not limited to the automatic block system 122, radios associated with the selected train are displayed in a block 212 and a list of parameters providing details, such as, but not limited to health score is displayed in a block 214 and other statuses like, fuel consumption details, etc. associated with the selected train are displayed in a block 220. It is contemplated that the display in the GUI 106 at the block 212 includes various number of assets associated with the selected train and the list of assets may be viewed by scrolling down the list in the block 212. The operator may further select a specific asset associated with the selected train to display health data pertaining to the specific asset. Upon selection of the asset from the list of assets from the block 212, the display in the GUI 106 displays sub-assets associated with the selected asset along with their predicted risk and statuses in a block 218 and also a visual/virtual representation of the selected asset in a block 222. The operator may further select the visual representation of the asset to request a display of visual representation of the health data of sub-assets associated with the selected asset.

In an exemplary embodiment, as illustrated in FIG. 2, the operator has requested through the GUI 106 to provide the details pertaining to health data of a train 'M00004' at the block 210. Although the train 'M00004' is selected by an operator for determining health data of the train 'M00004', it is to be understood that the GUI 106 displays list of various other trains such as for example 'MAC00001', 'MAC00002', 'MAC0005', etc. in the block 210. The selection of train 'M00004' illustrated herein is merely exemplary in nature, and hence, non-limiting of this disclosure. The operator may also select any other train listed in the block 210 in the GUI 106 for obtaining health data of those specific train(s). Upon selection of the train 'M00004', a list of assets associated with the train 'M00004' is displayed at the GUI 106 at the block 212. The operator may select any asset from the list of the assets to fetch a health score of the selected asset. In the exemplary embodiment, the operator has selected the asset 114 for determining health of the asset 114. Upon selection of the asset 114, details such as, but not limited to, health score of the selected asset 114 is displayed in the block 214 and other parameters of the asset 114 such as, but not limited to, status, fuel consumption, etc. are displayed in the block 220. The health score for the selected asset 114 is computed by the computing device 200 based on the health data received by the sensing unit 108. In the same exemplary embodiment, the health score is computed to be 87% and is displayed in the block 214. The GUI 106 further displays health data of sub-assets associated with the selected asset 114 at the block 218. Upon selection of the asset 114 from the list of assets in the block 212, the display in the GUI 106 displays sub-assets for example, fuel system, parking brakes, engine system, etc. associated with the selected asset 114 along with their predicted risk and statuses in the block 218. Also, a visual/virtual representation of the selected asset 114 is displayed in the block 222. The operator may further select the visual representation of the asset 114 to request a display of visual representation of the health data of the sub-assets associated with the selected asset 114.

In an embodiment, the computing device 200 may be disposed in the asset 114, i.e., an engine compartment of the selected train 'M00004' for accessing heath data by the operator of the selected train 'M00004'. In another embodiment, the computing device 200 may be disposed at a remote station (not shown) and configured to communicate remotely with the train 'M00004' to receive health data for analyzing health of the any asset of the train 'M00004'. In this embodiment, the train 'M00004' may be an unmanned train. The operator present at the remote station may operate the computing device 200 to receive the health data from the sensing unit 108 based on the data from the plurality of sensors 102a, 102b, 102c, 102d, 102e, and 102f disposed in asset 114 of the train 'M00004' to take necessary actions in response to health issues displayed in the GUI 106. In an embodiment, the computing device 200 is configured to receive continuous stream of health data from all of the trains plying in the specific region of a place. The continuously received health data may be analyzed for continuously monitoring health of the train 'M00004'. In this embodiment, the controller 104 may be configured to communicate with a central server (not shown) to store the health data received from the sensing unit 108 for taking necessary actions in response to the health data.

Figure 3:
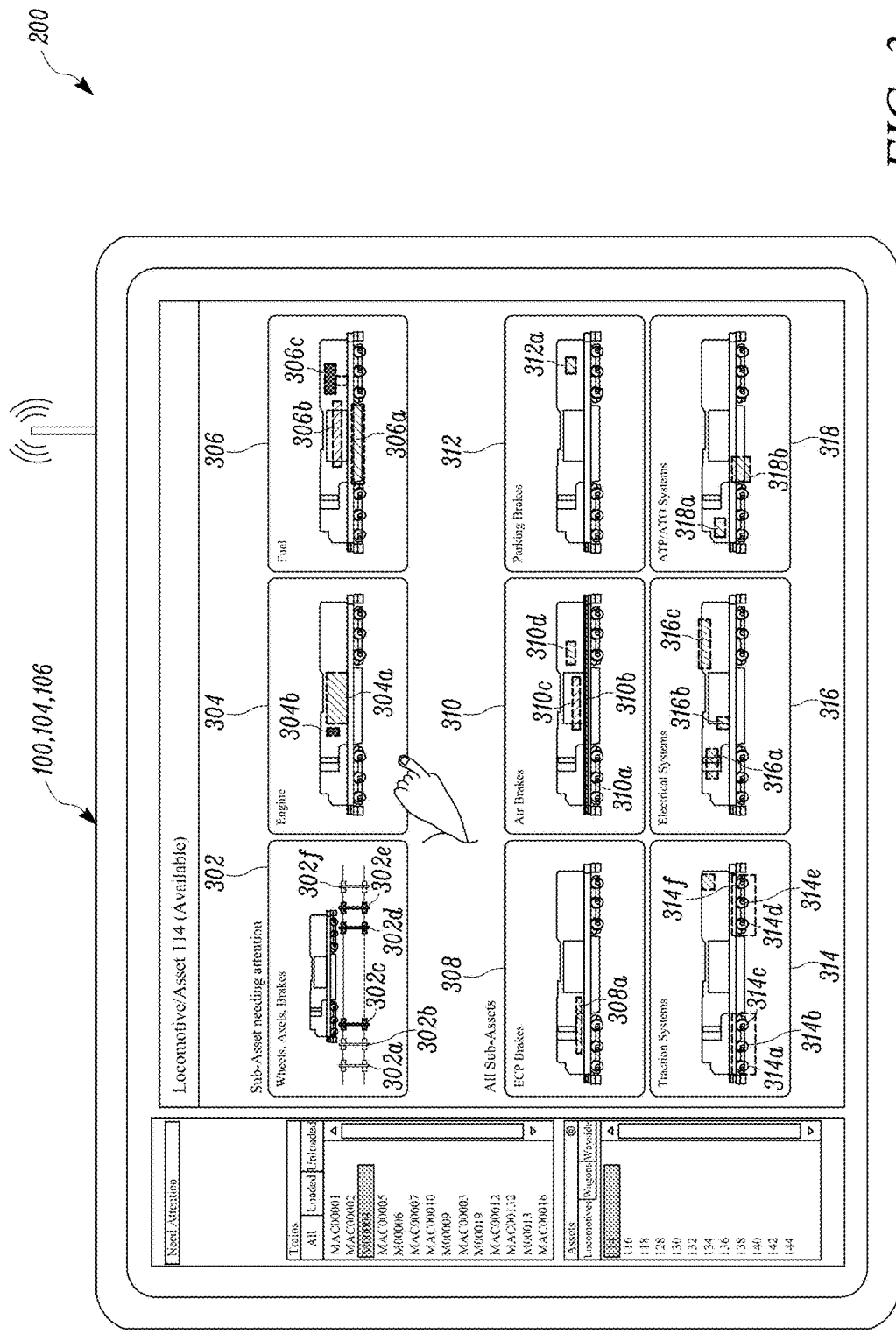
FIG. 3 is a diagrammatic representation of an exemplary customizable portable computing device for providing user-selectable options pertaining to check health data of the assets of the train, in accordance with various embodiment of the disclosure.

FIG. 3 illustrates a diagrammatic representation of an exemplary customizable computing device 200 for providing user-selectable options pertaining to analyze health data of the selected asset 114 of the train 'M00004', in accordance with an exemplary embodiment of the disclosure. Upon selection of the visual representation of the asset 114 by the operator as shown in FIG. 2 at the block 222 to analyze health data of the asset 114, the display in the GUI 106 provides visual representation of all the sub-assets associated with the asset 114. The controller 104 is configured to display the visual representation of the sub-assets based on the health data and predicted risk associated with the sub-assets.

The visual representation of the sub-assets displayed herein, relates to sub-assets such as, but not limited to a wheel, axles and brakes system 302, an engine system 304, a fuel system 306, an ECP brakes 308, an air brakes 310, parking brakes 312, a traction system 314, an electrical system 316 and an ATP/ATO system 318. The computing device 200 determines the health data of each sub-asset based on the data received by the sensor 102a associated with the asset 114. The display in the GUI 106 is configured to display the visual representation of the sub-assets based on the health score and malfunctioning of the sub-assets. In the illustrated exemplary embodiment, the sub-assets, the wheel, axles and brakes system 302, the engine system 304, the fuel system 306, are displayed at a top of the display in the GUI 106 and the remaining sub-assets; the ECP brakes 308, the air brakes 310, the parking brakes 312, the traction system 314, the electrical system 316 and the ATP/ATO system 318 are displayed below the sub-assets; the wheel, axles and brakes system 302, the engine system 304, the fuel system 306. This is done so based on the heath data, as the computing device 200 may have determined that the sub-assets, the wheel, axles and brakes system 302, the engine system 304, the fuel system 306 may require immediate action based on health data. The visual representation of the sub-assets of the wheel, axles and brakes system 302, the engine system 304, the fuel system 306 displays that the elements in these sub-assets requires immediate action as some elements of the sub-assets are predicted to be malfunctioning and/or some elements of the sub-assets are predicted as having a possibility of malfunction, or in other words tending to malfunction. The elements of the sub-assets, the wheel, axles and brakes system 302, the engine system 304, the fuel system 306 that are predicted to be malfunctioning require immediate replacement/repair and the elements of the sub-assets wheel, axles and brakes system 302, the engine system 304, the fuel system 306 that are predicted as tending to malfunction are to be repaired.

In an embodiment, the visual representation of the sub-asset; the wheel, axle and brakes system 302 includes elements such as axles 302a, 302b, 302c, 302d, 302e and 302f The axles 302c, 302d and 302e are predicted to be malfunctioning and they are displayed/distinguished, in the GUI 106, by highlighting by way of a color-coded scheme or any other scheme in the visual representation. The axles 302a, 302b and 302f are predicted to be tending to malfunctioning and they are displayed by highlighting by way of a color-coded scheme in the visual representation. In the illustrated embodiment, the elements that are tending to malfunction are depicted by way of hatching the elements, for example, the elements 302a, 302b and 302f. The visual representation of the engine sub-asset 304 includes an element 304a and 304b. The visual representation displays that the element 304b is predicted to be malfunctioning and the element 304a is predicted to be tending to malfunction. From the visual representation, it may be clear that the element 304b requires an immediate action of replacement and the element 304a requires a repair, in near future, to prevent complete malfunction of the element 304a. The visual representation of the sub-asset fuel system 306 includes elements 306a, 306b, and 306c. In these elements, the element 306c is predicted to be malfunctioning and thus requires an immediate action of replacement of the element 306c. The elements 306a and 306b are predicted to be tending to malfunction and therefore the element 306a and 306b requires a repair to prevent complete malfunction of the elements, in near future.

In an embodiment, the sub-assets of the ECP brakes 308, the air brakes 310, and the parking brakes 312, the traction system 314, the electrical system 316 and the ATP/ATO system 318 are predicted to include elements which are tending to malfunction. In an embodiment, elements in the sub-asset, ECP brakes 308, the element 308a is predicted as tending to malfunction and therefore the element 308a requires a repair, in near future, to prevent complete malfunction of the element 308a. In an embodiment, in the air brakes 310, the elements 310b, 310c and 310d are predicted as tending to malfunction and therefore the elements 310b, 310c and 310d requires a repair to prevent complete malfunction of the elements 310b, 310c and 310d in near future. The elements 310a of the air brakes are predicted to be functioning properly and therefore do not require any action. In an embodiment, elements in the sub-asset, the parking brakes 312, the element 312a is predicted as tending to malfunction and therefore the element 312a requires a repair, in near future, to prevent complete malfunction of the element 312a.

In an embodiment, the elements 314g in the sub-asset traction system 314, is predicted as tending to malfunction and therefore the element 314g requires a repair, in near future, to prevent complete malfunction of the element 314g. The elements 314a, 314b, 314c, 314d, 314e and 314f are predicted to be functioning properly and therefore do not require any action. In an embodiment, elements in the sub-asset, electrical system 316, the elements 316a, 316b and 316c are predicted as tending to malfunction and therefore the elements 316a, 316b and 316c require a repair, in near future, to prevent complete malfunction of the elements 316a, 316b and 316c. In an embodiment, elements in the sub-asset, ATP/ATO brakes 318, the elements 318a and 318b are predicted as tending to malfunction and therefore the elements 318a and 318b require a repair, in near future, to prevent complete malfunction of the elements 318a and 318b.

In an embodiment, the GUI 106 is configured to display the sub-assets which are predicted to be malfunctioning, tending to malfunction and functioning properly in color-coded schemes or representations. The first color-coded scheme includes RED color. The second color-coded scheme includes YELLOW and the third color-coded scheme includes BLUE. In an exemplary embodiment, if the element of the sub-asset is represented in the GUI 106 in RED color, it implies that the element is malfunctioning. As the FIGS. are not provided with any colors, it is to be understood that the color RED as construed herein, corresponds to darkened areas represented in the elements of the sub-assets. In another embodiment, if the element of the sub-asset is represented in the GUI 106 in YELLOW color, it implies that the element is tending to malfunction in near future. Further, it is to be understood that the color YELLOW as construed herein, corresponds to hatched area represented in the elements of the sub-assets. In another embodiment, if the element of the sub-asset is represented in the GUI 106 in BLUE color, it implies that the element is functioning properly. Further, it is to be understood that the color BLUE as construed herein, corresponds to dotted blocked areas represented in the elements of the sub-assets.

The operator after analyzing the health data depicted in the GUI 106 in the computing device 200 can identify the sub-assets associated with the asset 114 which needs immediate action and may be flagged to ensure suitable remedial actions are taken care in a timely manner. The actions may include either repairing the elements of the sub-assets or replacement of the elements of the sub-assets.

In an exemplary embodiment as shown in FIG. 3 the operator identifies that the sub-asset such as wheel, axles, brakes 302, the engine system 304 and the fuel system 306 require immediate actions for proper and continuous working of the train 'M00001'. The operator selects the particular sub-asset from the identified asset to determine further details about the elements of the sub-asset which may be requiring a repair or a replacement. In an exemplary embodiment, the operator selects the sub-asset, engine system 304 for analyzing the elements for repair or replacement. Upon selection of the sub-asset engine system 304, the display in the GUI 106 displays visual representation of the engine sub-asset 304 in block 402 as shown in FIG. 4

Figure 4:
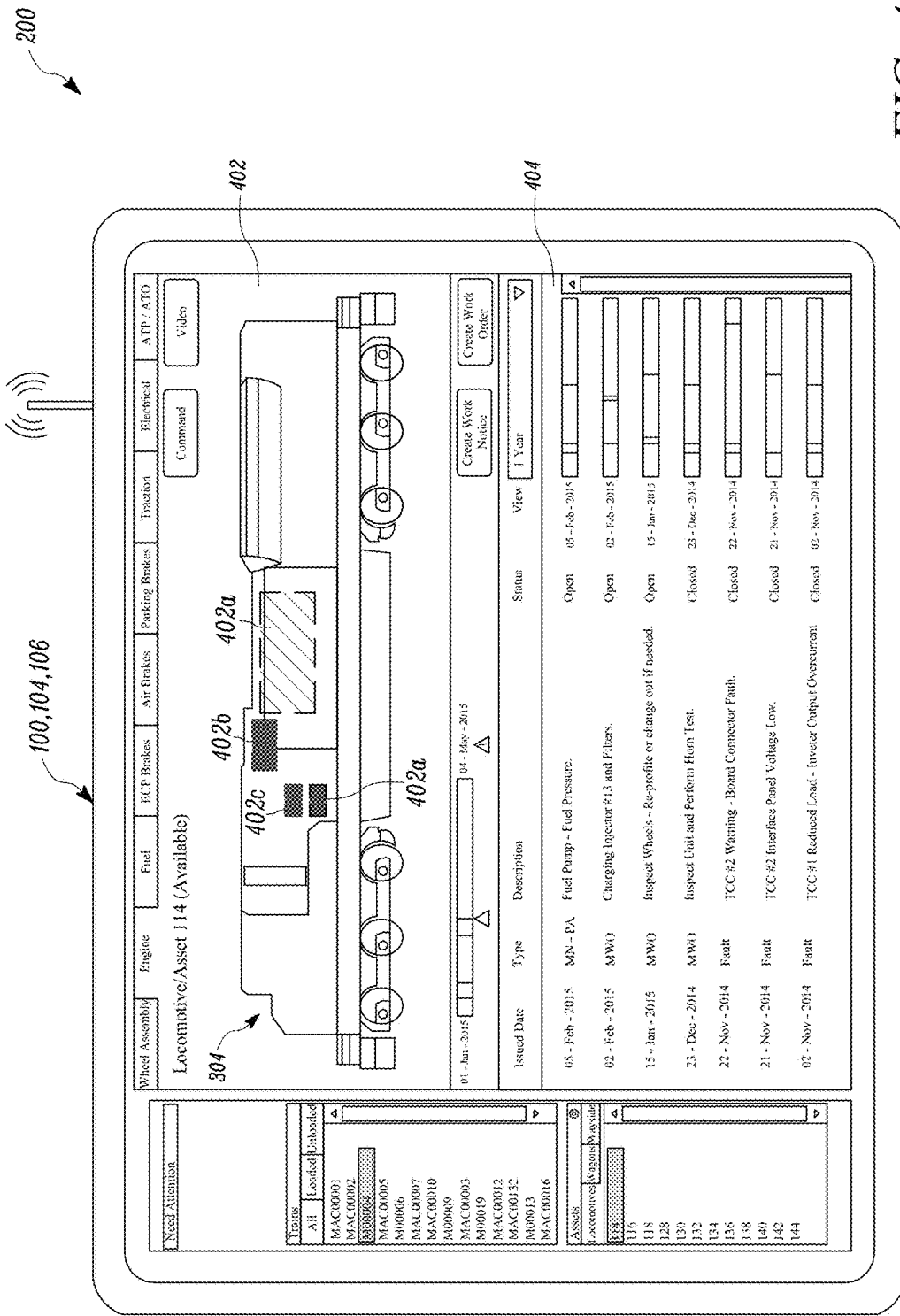
FIG. 4 is a diagrammatic representation of an exemplary customizable portable computing device for providing user-selectable option pertaining to flag desired sub-asset based on the health data of the asset of the train, in accordance with various embodiment of the disclosure.

FIG. 4 illustrates a diagrammatic representation the sub-asset, the engine system 304 of the asset 114 in the train 'M00004' in accordance with an embodiment of the disclosure. Upon analyzing the health data of the sub-assets associated with asset 114, the operator may further analyze the sub-asset in detail and flag issues of malfunctioning of the elements of the sub-assets. In an exemplary embodiment, the operator has selected the engine system 304 as shown in FIG. 3. A visual representation of the engine system 304 is displayed in the GUI 106 for further analysis of the health of the elements in the engine system 304. The visual representation in the GUI 106 is displayed in block 402. In the exemplary embodiment of FIG. 4, elements of the engine system 302 which are predicted to be malfunctioning are 402a, 402b and 402c. These elements 402a, 402b and 402c are to be repaired or replaced for proper functioning of the engine system 304. In an embodiment, the elements 402a, 402b and 402c are highlighted by darkening the areas. In an embodiment, the darkened areas may be represented by RED color. In an embodiment, the element 402d is determined to be tending to malfunction in near future and is displayed in YELLOW color.

Further, at block 404, the operator, after noticing that the elements 402a, 402b and 402c are malfunctioning, may flag the elements 402a, 402b and 402c for repair/replacement. Also, when the operator notices that the element 402d is tending to malfunction, the operator flags the element 402d for servicing. The GUI 106 also provides an option to reset the flagged issues associated with any elements of the engine system 304.

In an embodiment, the sensing unit 108 is further configured to determine operation data of the one or more sub-assets, the operation data including one or more of an in-service distance, an in-service time, a maintenance distance, and a maintenance time, that is, the period of time or a distance travelled by the train 110 for which a sub-asset has been in service or have been operating without maintenance. The controller 104 which is in communication with the sensing unit 108 is further configured to flag the one or more sub-assets in the visual representation of the desired asset based on the operation data, using a fourth color-coded scheme.

In an embodiment, the controller 104 is further configured to receive a manual flag command pertaining to the one or more sub-assets, and to flag the one or more sub-assets in the visual representation of the desired asset in response to receiving the manual flag command, using a fifth color-coded scheme.

In an embodiment, the controller 104 is further configured to receive a flag reset command pertaining to one or more sub-assets, and to remove the flag, in the GUI, from the one or more sub-assets in the visual representation of the desired asset in response to receiving the flag reset command. The controller 104 is further configured to remove the flag, in the GUI, from the one or more sub-assets in the visual representation of the desired asset based on predefined rules, the predefined rules based on one or more of a pre-set time period, a service schedule, and a geo-fence. For example, when the train 110 moves out of a service yard, it is assumed that all the sub-assets have been serviced, repaired or replaced, and therefore using geo-fencing when it is determined that the train 110 has moved out of the service yard all the flags are reset to indicate no malfunction of any of the sub-asset any longer.

In an embodiment, the controller 104 is further configured to display, in the GUI, a list of sub-assets, the list of sub-assets configurable to sort the sub-assets based at least in part on the health data thereof. This way it will be easier for the operator to identify the sub-assets which require immediate attention as the same will be displayed at the top of the list.

In an embodiment, the controller 104 is further configured to generate a custom list of sub-assets to be delivered as a text message to service personnel, the custom list of sub-assets configurable to sort the sub-assets based at least in part on a profile of the service personnel. For example, the controller 104 may create a custom list of all the malfunctions with the sub-asset, such as the engine system 304, and further share this custom list to a serviceman specifically appointed to service the elements of the engine system 304.

INDUSTRIAL APPLICABILITY

In an embodiment, the display in the GUI 106 provides an easy and simple way of representing the assets which are malfunctioning or tending to malfunction. Thus, the GUI 106 in the system 100 is user friendly and analysis of the health data of any specific asset or sub-asset is convenient. In addition, GUI 106 also provides an option to flag the issues relating to any assets or sub assets and thus making the system 100 to be more efficient. As the system 100 provides a visual representation, determining the elements of the assets/sub-assets that are malfunctioning or tending to malfunction or work properly becomes easier.

Figure 5:
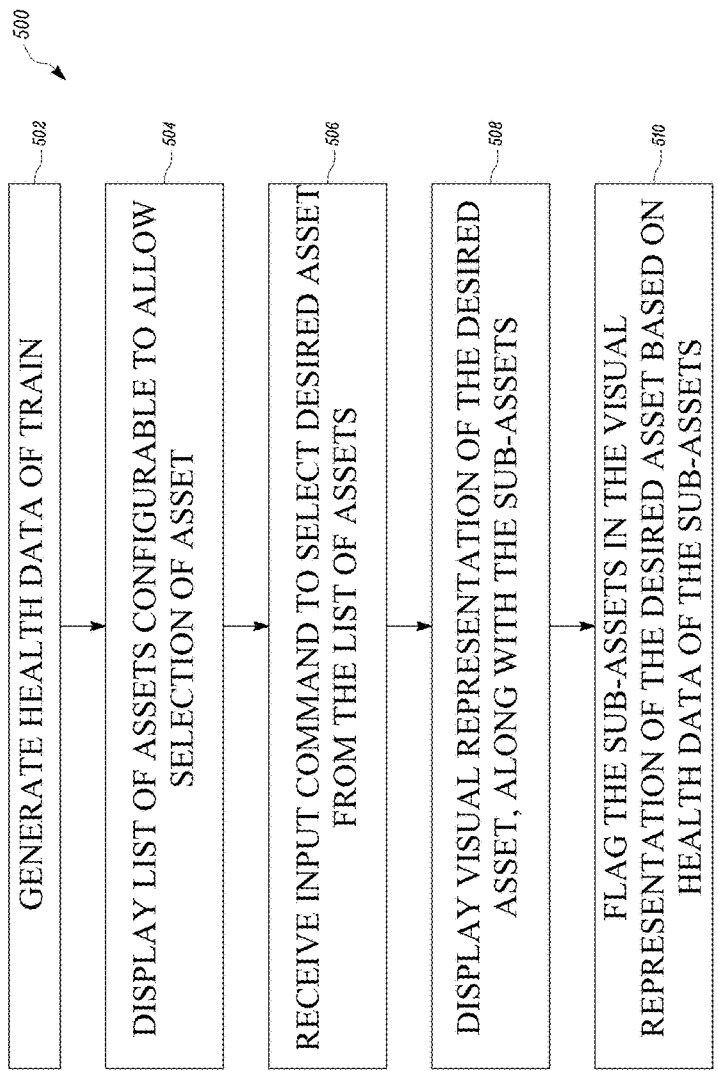
FIG. 5 is a flowchart of a method for analyzing health of assets in the train, according to an embodiment of the present disclosure.

FIG. 5 illustrates a flowchart of a computer implemented method 500 for analyzing health of assets in the train 110, according to an embodiment of the present disclosure. An input request from the operator is provided in the GUI 106 to generate the health data of the asset 114 at step 502, and more specifically the health data of the assets. An overall health summary of the train 110 is generated and displayed in the GUI 106 along with a list of assets associated with the train 110 at the step 504. The operator can further select any specific asset to provide the health data of the selected asset by way of visual or virtual representation of the selected asset at step 506. After obtaining the visual representation of the selected asset, the operator can request for health data of sub-assets associated with the selected asset. The controller 104 is further configured to issue a command to the sensing unit 108 to generate the health data of the sub-assets as requested by the operator. The health data of the sub-assets are generated by the plurality of sensors associated with the desired asset. At step 508, the list of sub-assets along with their health data based on the data received from the plurality of the sensors is displayed in the GUI 106 for taking further actions by the operator. The operator after analyzing the health data of the sub-assets of the desired asset can flag the desired sub-asset to take any necessary actions by a technician at the service station while servicing the asset of the train at the step 510.

Figure 6:
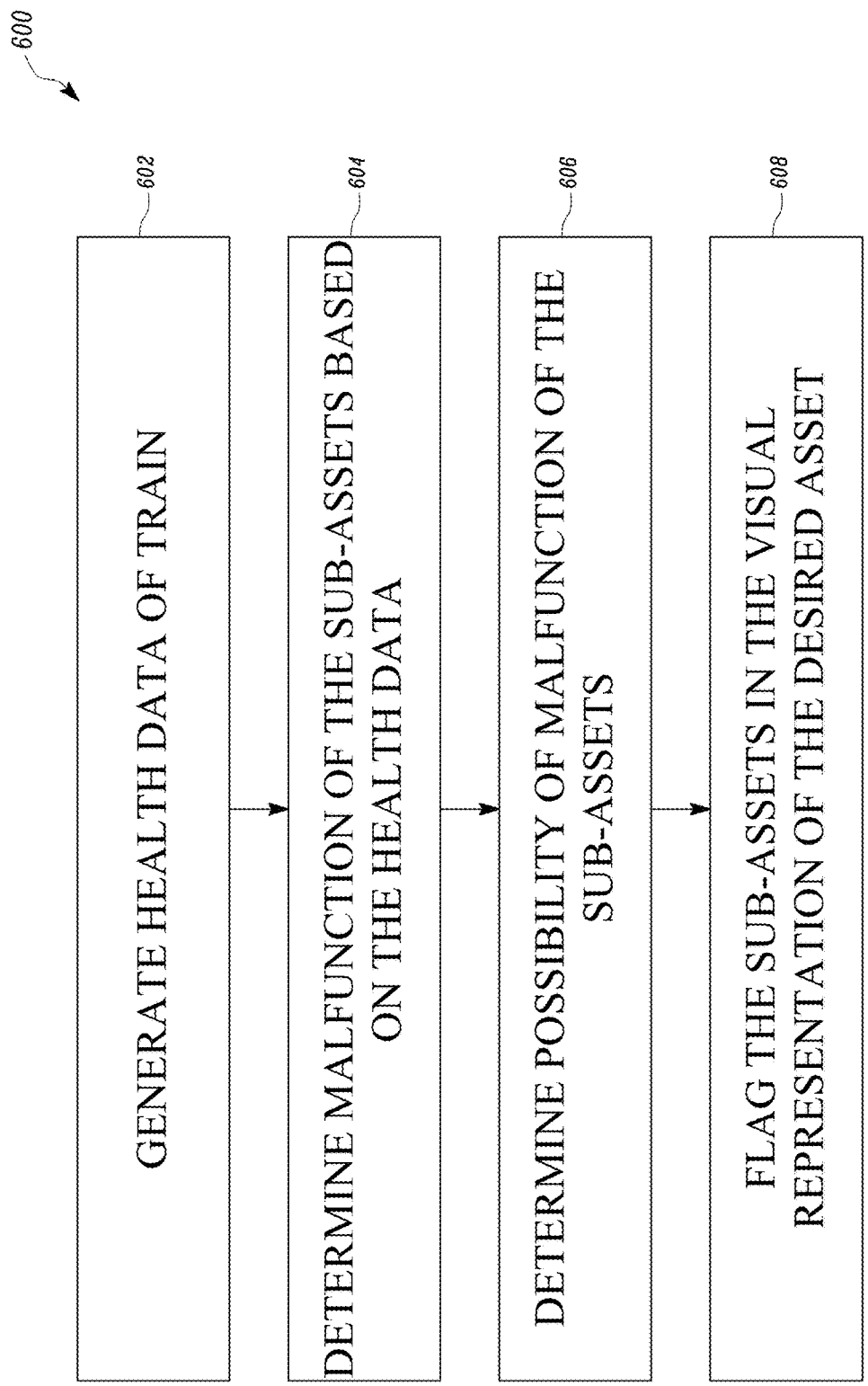
FIG. 6 is a flowchart of a method for analyzing health of assets in the train, according to another embodiment of the present disclosure.

FIG. 6 illustrates a flowchart of a method 600 for analyzing health of assets in the train 110, according to another embodiment of the present disclosure. An input request from the operator is provided in the GUI 106 to generate the health data of the train 110 at step 602, and more specifically the health data of the assets of the train 110. At step 604, the controller 104 is configured to determine a malfunction of the one or more sub-assets, in an asset, based on the health data received by the plurality of sensors. At step 606, the controller 104 is further configured to determine a possibility of a malfunction of the one or more sub-assets in a predefined upcoming time period based on the health data. At step 608, the controller 104 is further configured to flag the one or more sub-assets in the visual representation of the desired asset based on the determination of the malfunction and the possibility of a malfunction of the one or more sub-assets.

Figure 7:
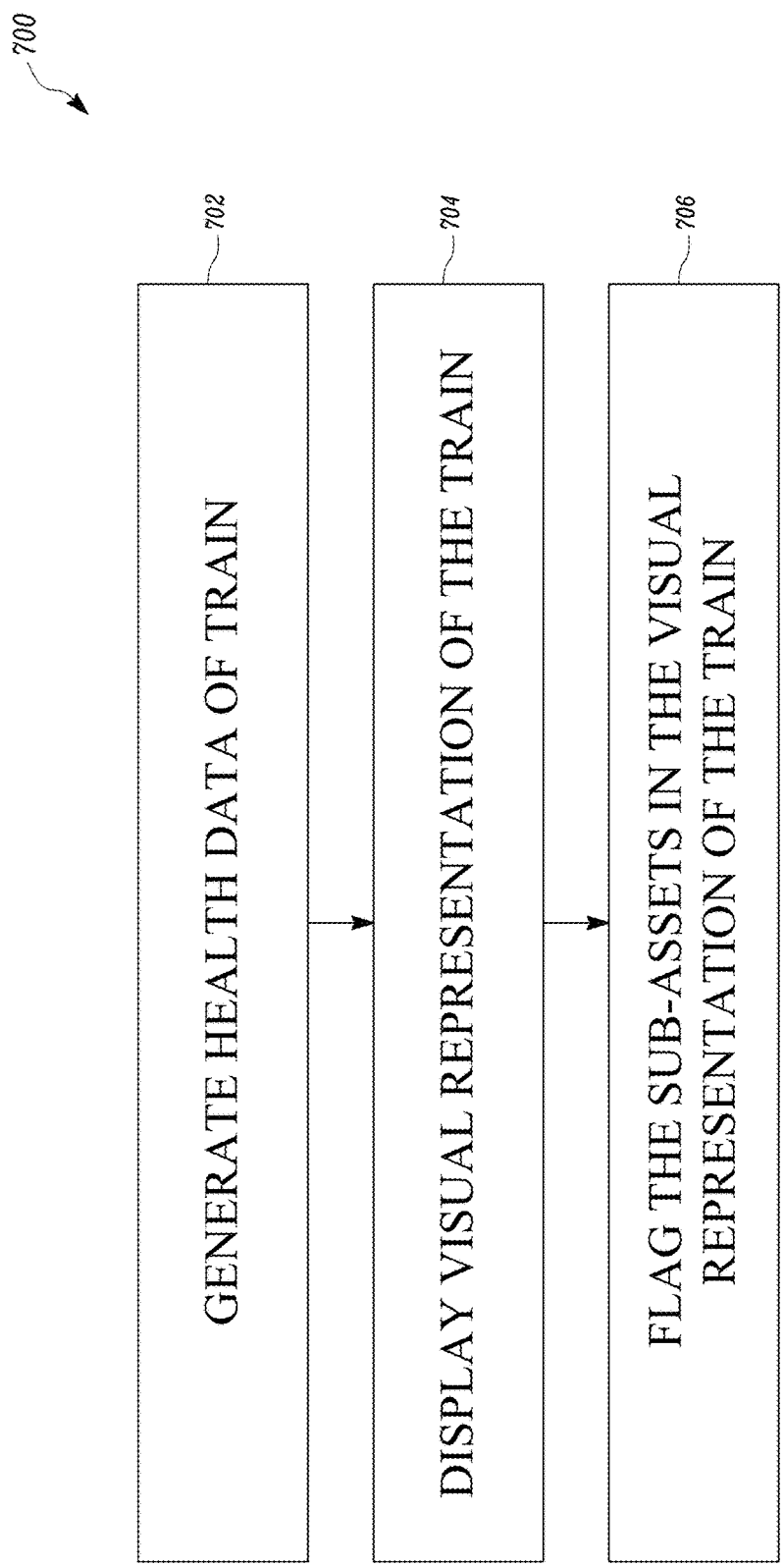
FIG. 7 is a flowchart of a method for analyzing health of assets in the train, according to yet another embodiment of the present disclosure.

FIG. 7 illustrates a flowchart of a method 700 for analyzing health of assets in the train 110, according to yet another embodiment of the present disclosure. An input request from the operator is provided in the GUI 106 to generate the health data of the train 110 at step 702. At step 704, the controller 104 is configured to display a visual representation of the train in the GUI 106. At step 706 the controller 104 is further configured to flag the one or more assets and/or sub-assets in the visual representation of the train based on the health data of the assets and the sub-assets.

While aspects of the present disclosure have been particularly shown and described with reference to the embodiments above, it will be understood by those skilled in the art that various additional embodiments may be contemplated by the modification of the disclosed machines, systems and methods without departing from the scope of what is disclosed. Such embodiments should be understood to fall within the scope of the present disclosure as determined based upon the claims and any equivalents thereof.

What is claimed is:

1. A system for analyzing health of assets in a train, each of the asset having one or more sub-assets, the system comprising:
    a sensing unit having a plurality of sensors associated with the one or more sub-assets, the sensing unit configured to generate health data of the one or more sub-assets; and
    a controller in communication with the sensing unit to receive the health data, the controller configured to:
    display, in a graphical user interface (GUI), a list of assets, the list of assets configurable to allow selection of one asset therefrom;
    receive an input command, in the GUI, to select a desired asset from the list of assets, the input command configurable to request information about the health of the desired asset;
    display, in the GUI, a visual representation of the desired asset, along with the one or more sub-assets, in response to receipt of the input command; and
    flag, in the GUI, the one or more sub-assets in the visual representation of the desired asset based on the health data of the one or more sub-assets.

2. The system of claim 1, wherein the controller is further configured to determine a malfunction of the one or more sub-assets based on the health data.

3. The system of claim 2, wherein the controller is further configured to flag the one or more sub-assets in the visual representation of the desired asset based on the determined malfunction of the one or more sub-assets, using a first color scheme.

4. The system of claim 1, wherein the controller is further configured to determine a possibility of a malfunction of the one or more sub-assets in a predefined upcoming time period based on the health data.

5. The system of claim 4, wherein the controller is further configured to flag the one or more sub-assets in the visual representation of the desired asset based on the determined possibility of a malfunction of the one or more sub-assets, using a second colour scheme.

6. The system of claim 1, wherein the sensing unit is further configured to determine operation data of the one or more sub-assets, the operation data comprising one or more of an in-service distance, an in-service time, a maintenance distance, and a maintenance time.

7. The system of claim 6, wherein the controller is further configured to flag the one or more sub-assets in the visual representation of the desired asset based on the operation data, using a fourth colour scheme.

8. The system of claim 1, wherein the controller is further configured to receive a manual flag command pertaining to the one or more sub-assets, and wherein the controller is further configured to flag the one or more sub-assets in the visual representation of the desired asset in response to receiving the manual flag command, using a fifth colour scheme.

9. The system of claim 1, wherein the controller is further configured to receive a flag reset command pertaining to one or more sub-assets, and wherein the controller is further configured to remove the flag, in the GUI, from the one or more sub-assets in the visual representation of the desired asset in response to receiving the flag reset command.

10. The system of claim 1, wherein the controller is further configured to remove the flag, in the GUI, from the one or more sub-assets in the visual representation of the desired asset based on predefined rules, the predefined rules based on one or more of a pre-set time period, a service schedule, and a geo-fence.

11. The system of claim 1, wherein the controller is further configured to display, in the GUI, a list of sub-assets, and the list of sub-assets configurable to sort the sub-assets based at least in part on the health data thereof.

12. The system of claim 1, wherein the controller is further configured to generate a custom list of sub-assets to be delivered as a text message to a service personnel, the custom list of sub-assets configurable to sort the sub-assets based at least in part on a profile of the service personnel.

13. The system of claim 1, wherein the controller is further configured to display, in the GUI, a visual representation of the train, the controller further configured to flag the one or more sub-assets in the visual representation of the train based on the health data of the one or more sub-assets.

14. The system of claim 1, wherein the controller is further configured to determine a health score of the desired asset based on the health data of the one or more sub-assets thereof, and wherein the controller is further configured to display, in the GUI, the health score.

15. The system of claim 1, wherein the controller and the GUI are configured to integrally form part of a computing device.

16. The system of claim 15, wherein the computing device is one of a laptop, a personal computer, a personal digital assistant (PDA), a tablet device, and a smartphone.

17. A computer-implemented method for analyzing health of assets in a train, each of the asset having one or more sub-assets, the method comprising:
    generating overall health data of the train;
    displaying a list of assets, the list of assets configurable to allow selection of one asset therefrom;
    receiving an input command to select a desired asset from the list of assets;
    displaying a visual representation of the desired asset, along with the one or more sub-assets, in response to receipt of the input command; and
    flagging the one or more sub-assets in the visual representation of the desired asset based on the health data of the one or more sub-assets.

18. The computer-implemented method of claim 17 further comprising:
    determining a malfunction of the one or more sub-assets based on the health data;
    determining a possibility of a malfunction of the one or more sub-assets in a predefined upcoming time period based on the health data; and
    flagging the one or more sub-assets in the visual representation of the desired asset based on the determination of the malfunction and the possibility of a malfunction of the one or more sub-assets.

19. The computer-implemented method of claim 17 further comprising:
    displaying a visual representation of the train; and
    flagging the one or more sub-assets in the visual representation of the train based on the health data of the one or more sub-assets.

20. A computing device having a medium to store sequences of instructions which when executed analyze health of assets in a train, each of the asset having one or more sub-assets, the computing device comprising:
    a display unit configured to provide a graphical user interface (GUI); and
    a controller configured to:
        display, in the GUI, a list of assets, the list of assets configurable to allow selection of one asset therefrom;
        receive an input command, in the GUI, to select a desired asset from the list of assets, the input command configurable to request information about health of the desired asset;
        display, in the GUI, a visual representation of the desired asset, along with the one or more sub-assets, in response to receipt of the input command; and
        flag, in the GUI, the one or more sub-assets in the visual representation of the desired asset based on health data of the one or more sub-assets.

* * * * *